United States Patent Office 3,330,970
Patented July 11, 1967

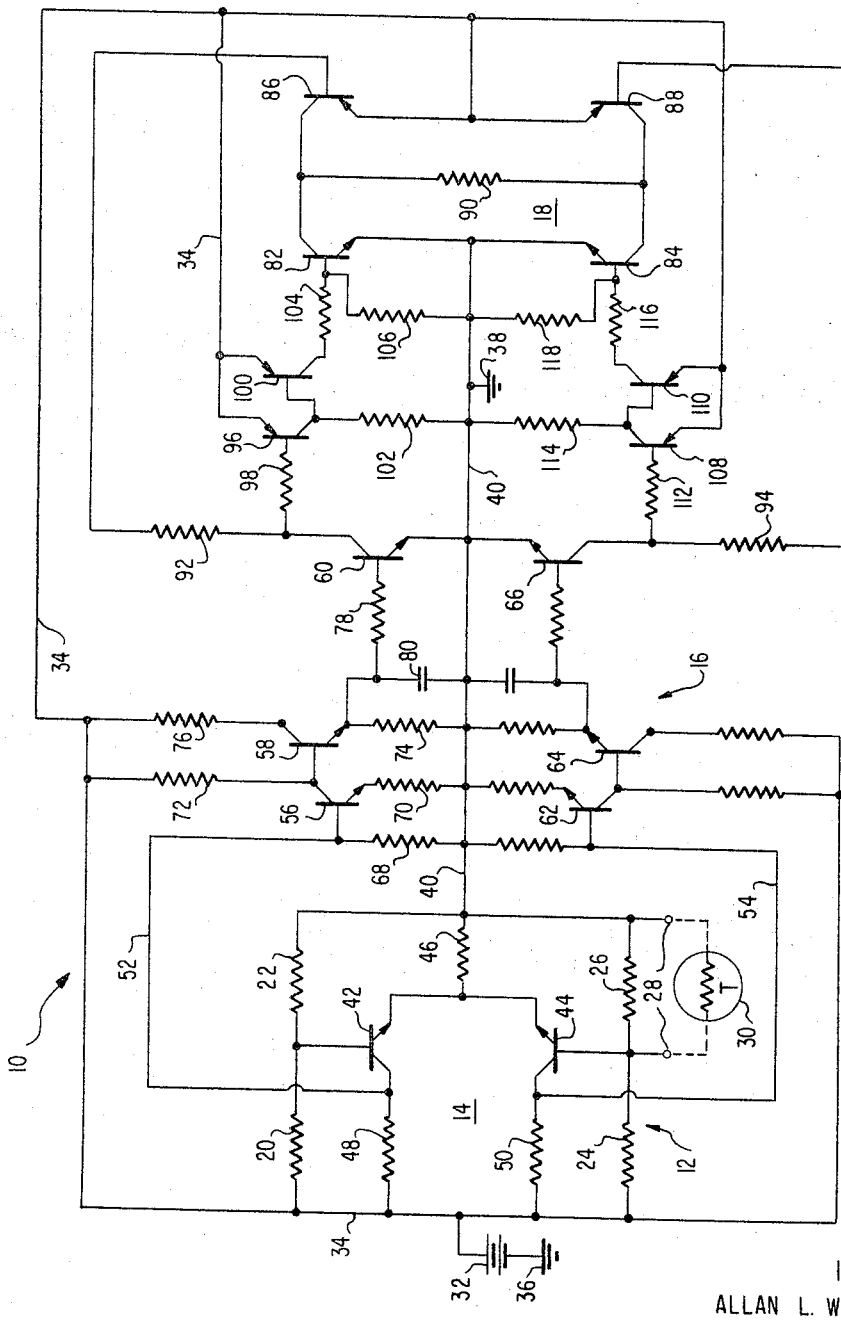

3,330,970
PROPORTIONAL CONTROL CIRCUIT WITH BI-DIRECTIONAL OUTPUT
Allan L. Wennerberg and Fritz Hans Schroeder, St. Joseph, Mich., assignors to Whirlpool Corporation, a corporation of Delaware
Filed Aug. 7, 1964, Ser. No. 388,075
7 Claims. (Cl. 307—88.5)

This invention relates in general to an electronic control circuit, and more particularly to a novel electronic control circuit for providing an output signal which is proportional in both magnitude and direction to a variable input signal. This invention also relates to a novel circuit arrangement for sensing said input signal and differentially amplifying same to control further amplifying and driving circuitry in response thereto.

In a number of industrial situations it is necessary to maintain a very close control over one or more variable conditions, such as temperature, pressure, flow rate, etc. In most cases means are commonly known and available for sensing or monitoring the variable condition as well as for restoring it to a desired value, and it is only necessary to somehow control the restoration means in response to the sensing means. In one form of somewhat crude arrangement, for example, which may well suffice in systems in which absolute accuracy is not essential, a pressure transducer may be used to trigger a threshold switch which in turn may energize a pump motor to restore a minimum pressure level. Among the inherent disadvantages of such an arrangement are the facts that the pump can only alter the pressure in one direction, i.e., can only increase it, and the pump output, once the motor is energized, is constant rather than being a function of the magnitude of the error signal from the pressure transducer.

In more sophisticated systems, where a variable condition must be regulated to within very close tolerances, it is necessary that the restoration means be capable of effecting both an increase and a decrease in the variable, as required, and also that such changes or rebalancings are made at a rate which is proportional to the precise magnitude of the error signal produced by the sensing means. In such situations the need arises for an accurate and reliable control circuit that is capable of providing a bi-directional output signal, for a restoration means, that is proportional in both magnitude and direction to a variable input signal derived from a sensing means, and it is a primary object of this invention to provide such a control circuit.

It is a further object of this invention to provide a novel electronic proportional control circuit that is extremely sensitive to the variations of a continuously monitored input signal and which is instantaneously responsive to same to provide an amplified and closely regulated bi-directional D.C. output signal.

It is a further object of this invention to provide such a circuit which exclusively employs semiconductive active elements, is insensitive to spurious noise signals and is self-protective in the event of a malfunction.

It is a further object of this invention to provide such a cricuit which advantageously employs an input bridge sensing means, a differential amplifier responsive thereto, a dual channel signal amplifier for providing a substantial gain of the error signal and an output driving bridge for controlling the energization of a load device connected across its output diagonal.

It is a further object of this invention to provide such a circuit which may be advantageously employed, by way of example, in a temperature control system using a thermistor sensing element and a thermoelectric load device.

It is a further object of this invention to provide a novel electronic circuit arrangement including an input sensing bridge and a differential amplifier responsive thereto for controlling further amplifying and driving circuitry in a proportional control environment.

These and other objects of the present invention will become readily apparent to those skilled in the art from a consideration of tht following description of a preferred embodiment thereof taken in conjunction with the single figure in the drawing, which represents a schematic diagram of a preferred embodiment of the invention adapted, for purposes of illustration to be used in a temperature control system.

Referring now to the single figure shown in the drawing, the proportional control circuit of this invention, designated generally by reference numeral 10, includes an input sensing bridge 12, a differential amplifier 14, a dual channel signal amplifier 16 and an output driving bridge 18. The input bridge 12 is a standard, four-leg resistive bridge including resistors 20, 22, 24 and 26 individually connected in the respective legs thereof. A pair of input terminals 28 are connected across one leg of the bridge 12 in parallel with resistor 26, and these terminals are adapted to be connected to any suitable input sensing device, such as a thermistor, a strain gage, a pressure transducer, etc. Although the particular input device employed may be any one of a number of available types chosen to meet the requirements of the system with which the circuit is used, for purposes of illustration a thermistor element 30 has been shown as being connected to the input terminals 28 and the operation of the control circuit 10 will be explained in connection therewith. It is to be understood that a thermistor is a specialized type of temperature sensitive resistor that exhibits a negative temperature coefficient of resistance. That is, as the temperature of the resistor increases its ohmic value decreases, and vice versa.

To achieve an initial balance of the sensing bridge 12, the value of resistor 22 is chosen to be equal to the resistance offered by the parallel combination of resistor 26 and thermistor 30 when the desired temperature conditions exist in the system being monitored and controlled. In other words, the value of resistor 22 must be equal to the product of resistor 26 and thermistor 30 divided by their sum, as is well known in the art. In addition, resistors 20 and 24 are chosen to be of approximately equal value, and, in order to enhance the sensitivity of the bridge, these resistors are also chosen to be many times the value of resistor 22, in the ratio of 16:1 for example. In this manner, even a very small voltage change at the input terminals 28 causes a relatively large voltage change across resistor 24, thus rendering same more easily detectable.

A regulated source of D.C. potential 32 has its positive terminal connected to one input terminal of the bridge 12 over power supply line 34, and the negative terminal of the source is grounded at 36. The other input terminal of the bridge is connected to ground at 38 over a common ground line 40. As will be seen more clearly below, the source 32 serves as the single power supply for the entire control circuit 10, including all of the various sections thereof, thus contributing to the over-all simplicity of the circuit.

The differential amplifier stage 14 includes a pair of NPN transistors 42 and 44. The emitters of both transistors are tied to the ground line 40 through a common biasing resistor 46, and their collectors are individually coupled to the power supply line 34 through resistors 48 and 50. As seen in the drawing, the base of transistor 42 is connected to the junction point between resistors 20 and 22, while the base of transistor 44 is similarly connected to the junction point between resistors 24 and 26. These junction points actually serve as the output terminals of the sensing bridge 12, and in this manner they are coupled to the base inputs of the differential amplifier stage. The outputs of the differential amplifier stage are taken from the collectors of the transistors 42 and 44 and are coupled to the dual channel signal amplifier 16 over lines 52 and 54, respectively.

The dual channel signal amplifier 16 includes three cascaded NPN transistors in each parallel channel. The upper channel in the drawing comprises NPN transistors 56, 58 and 60, while the lower channel comprises NPN transistors 62, 64 and 66. Since both channels of the signal amplifier are completely symmetrical and mirror images of each other about the ground line 40, only the upper channel will be described in detail. It is to be understood that each circuit component in the upper channel has an exact counterpart in the lower channel of equal value and identical in function.

The base of transistor 56 serves as the input for the upper channel, and this is directly coupled to one of the outputs from the differential amplifier stage over line 52. The biasing potentials for transistor 56 are provided by resistor 68, connected between the base and ground line 40, resistor 70, connected between the emitter and ground line 40, and resistor 72, connected between the collector and power supply line 34. The values of these resistors are chosen so that when the input sensing bridge 12 is balanced and the desired temperature conditions exist in the system, transistor 56 is in a conductive state. The collector of transistor 56 is directly coupled to the base of transistor 58. Biasing potentials for the latter are provided by resistor 74, connected between the emitter and ground line 40, and resistor 76, connected between the collector and power supply line 34. The emitter output of transistor 58 is coupled to the base input of transistor 60 through a series resistor 78. An integrating capacitor 80 is connected between the emitter of transistor 58 and ground line 40 to smooth out any peak voltages or spurious noise signals which may be developed in the earlier circuit stages. The emitter of transistor 60 is directly coupled to the ground line 40. The collector output of transistor 60 is resistively coupled to the bases of two transistors in the output driving bridge stage and thus serve a dual function, as more fully described below.

The output driving bridge stage 18 consists essentially of a transistor bridge circuit including two pairs of opposite conductivity-type transistors with a bi-directional load device coupled across the output terminals of the bridge. Control transistors are also provided to protect the bridge circuit against damaging short circuit currents which might otherwise exist if both channels of the signal amplifier were simultaneously rendered conductive.

The output driving bridge circuit thus includes NPN transistors 82 and 84 with their emitter-collector paths connected in adjacent legs, and PNP transistors 86 and 88 with their emitter-collector paths similarly connected in the remaining adjacent legs. A bi-directional load device 90 is connected across the output terminals of the driving bridge. While the particular load device employed with the proportional control circuit of this invention may be any one of a number of available devices which meet the requirements of the system in which the circuit is used, it will be assumed for purposes of illustration that a thermoelectric element is present, and the operation of the circuit will be explained in connection therewith. As is well known in the art, a thermoelectric element produces a heating effect when current is passed through it in one direction and a cooling effect when current is passed through it in the other direction, and the heating or cooling effect in such elements is proportional to the magnitude of the current passing therethrough. Typical thermoelectric elements are more fully disclosed in the Mervin K. Baer, Jr., and Charles R. Loop application, Ser. No. 735,804, filed May 16, 1958, now abandoned, and assigned to the same assignee as is the present invention.

When the proportional control circuit 10 is thus provided with a thermistor sensing element 30 and a thermoelectric load device 90, it may be advantageously employed, by way of example, in a temperature control environment. That is, it may be used in any application where precise temperature regulation is required to within very close tolerances, such as $\mp.005$ degree Fahrenheit. Typical examples of such applications are found in quartz crystal oscillators, gyro assemblies, time delay circuits, etc. In another illustrative example, the sensing element could be a position transducer and the load device the field coil of a reversible D.C. motor. In such an application the proportional control circuit of the invention would be effective to maintain an output device driven by the motor in a mechanical position corresponding to that of a movable mechanical input member.

The base of transistor 86 is coupled to the collector output of transistor 60 through a series resistor 92, and in a similar manner the base of transistor 88 is coupled to the collector output of transistor 66 through a series resistor 94. The collector of transistor 60 is also coupled to the base of a PNP transistor 96 through a series resistor 98, and the collector of transistor 96 is directly coupled to the base of a further PNP transistor 100. The collector of transistor 96 is connected to the ground line 40 through a series resistor 102, and the emitters of transistors 96 and 100 are directly coupled to the power supply line 34. The collector of transistor 100 is coupled to the base of transistor 82 through a series resistor 104 and a biasing resistor 106 is connected between the ground line 40 and the base of transistor 82. A pair of PNP transistors 108 and 110 are connected between the collector output of transistor 66 in the lower channel of the signal amplifier and the base input of transistor 84 in the driving bridge in an identical manner as described above in the connection with transistors 96 and 100, and appropriate resistors 112, 114, 116 and 118 are similarly provided as shown. The positive terminal of the source 32 is coupled to one input terminal of the driving bridge 18 over power supply line 34, and the other input terminal of the bridge is connected to the ground line 40.

The operation of the proportional control circuit 10 may best be understood by first establishing the circuit conditions that exist when the system is in balance and the desired temperature conditions are present. Under these circumstances the sensing bridge would be balanced, transistors 42 and 44 would be equally conductive, and the input transistors 56 and 62 in both channels of the signal amplifier would be in their conductive states. Transistors 58 and 64 are normally non-conductive and their emitter potentials are thus sufficiently low to hold transistors 60 and 66, respectively, in their non-conductive states. The control transistors 96 and 108 would similarly be non-conductive while their associated control transistors 100 and 110 would be saturated. Finally, the driving bridge transistors 82 and 84 would be saturated but drawing negligible collector current and the transistors 86 and 88 would be non-conductive. Therefore, no current would be flowing through the thermoelectric load device 90 and it would be neither supplying heat to nor absorbing heat from the controlled temperature environment being regulated.

Let it be assumed now that due to external conditions the temperature of the system being regulated increases. This change is sensed immediately by the thermistor 30 and its effective resistance correspondingly decreases. As a result the overall resistance presented by the parallel network including the thermistor 30 and the resistor 26 decreases and more current flows therethrough. This increased current is drawn through resistor 24 and therefor the voltage drop across the latter increases, thus lowering the potential at the base of transistor 44. This causes transistor 44 to conduct less heavily with the result that its collector voltage increases and its emitter voltage decreases, these changes being due to the decreased voltage drops across resistors 50 and 46. Since the emitters of transistors 42 and 44 are tied together, the base-emitter potential of transistor 42 increases and the latter is rendered more conductive, which in turn causes the voltage at its collector to decrease. This decreased collector voltage is reflected over line 52 to the base of transistor 56 in the upper channel of the signal amplifier, and causes the transistor 56 to go from its conductive state to a non-conductive state. At the same time the increased collector voltage of transistor 44 is reflected over line 54 to the base of transistor 62 in the lower channel of the signal amplifier, thus clamping the transistor 62 in its conductive state.

Transistor 56 thus becomes less conductive to a degree controlled by the magnitude of the conduction of transistor 42, which is in turn a direct function of the magnitude of the decrease of the resistance of thermistor 30. As transistor 56 decreases conduction its collector potential increases and this renders transistor 58 more conductive. The emitter potential of transistor 58 therefore increases which in turn causes transistor 60 to become conductive. When the latter conducts its collector potential is lowered and this results in the PNP control transistor 96 being driven into a state of saturation. When transistor 96 saturates its collector potential increases and this drives the associated control transistor 100 from a state of saturation into a state of non-conduction. When this happens the collector potential of transistor 100 decreases sharply causing the normally saturated bridge transistor 82 to switch to a non-conductive state.

The decreased collector potential of transistor 60 is also applied to the base of transistor 86 through the resistor 92, and this renders the transistor 86 conductive to an extent controlled by the magnitude of the collector potential of transistor 60 plus the voltage drop across resistor 92. With transistor 86 conductive, a circuit path is completed from the source 32 over line 34, through transistor 86, through the thermoelectric load device 90, through the normally saturated transistor 84 and back to ground at 38. The load will of course be arranged so that when current flows through it in this direction a cooling effect will be produced, proportional to the magnitude of the current, which will tend to restore the desired temperature balance in the system. As the temperature thus decreases, the resistance of the thermistor 30 increases and gradually the normal electrical balance in the circuit will be restored and the load de-energized. It will thus be appreciated that with the novel control circuit of this invention an output current is produced which is proportional in both magnitude and direction to a variable input signal, which current may advantageously be employed to restore the normal or desired balance in the system with which the circuit is used.

It will be understood that if the temperature of the system had originally decreased the reverse circuit operation would have been effected and current driven through the load device in the opposite or heating direction.

In order to fully understand the protective functions provided by the control transistors 96, 100, 108 and 110, let it be assumed that a malfunction has occurred and both channels of the signal amplifier have become simultaneously energized. In this event, both of the bridge transistors 82 and 84 would be driven into their non-conductive states by their associated control transistors, thus eliminating a return path to the ground point 38 through the output birdge and rendering same safe from the damaging effects of short circuit currents.

While there has been shown and described herein a preferred embodiment of the invention, many minor substitutions and changes will be readily apparent to those skilled in the art, such as reversing the conductivity types of the transistors as well as the polarity of the source. Such substitutions and changes are to be considered as being well within the scope of the invention, and it is intended to limit same only as defined in the following claims.

We claim:
1. An electronic circuit for controlling the D.C. current through a load device in proportion to the magnitude and direction of a variable input signal, comprising:
 (a) sensing bridge means including a pair of input terminals connected across one leg thereof and adapted to receive the variable input signal, and a pair of output terminals,
 (b) D.C. differential amplifier means including a pair of transistors each having base, emitter and collector electrodes,
 (c) means individually connecting the output terminals of the sensing bridge means to the base electrodes of the transistors,
 (d) dual channel D.C. amplifying means including a pair of input terminals and a pair of output terminals,
 (e) means individually connecting the collector electrodes of the transistors to the input terminals of the dual channel amplifying means,
 (f) driving bridge means having a pair of output terminals and including four transistors individually connected in each leg thereof,
 (g) means individually connecting each output terminal of the dual channel amplifying means to two of the transistors in the driving bridge means, and
 (h) a bi-directional load device connected across the output terminals of the driving bridge means, whereby the D.C. current through the load device is proportional in both magnitude and direction to the variable input signal.
2. An electronic circuit as defined in claim 1 wherein the four transistors included in the driving bridge means comprises two pairs of transistors of opposite conductivity types.
3. An electronic circuit as defined in claim 1 wherein:
 (a) the dual channel amplifying means includes a pair of capacitors for smoothing out spurious noise signals, and
 (b) the means recited in sub-paragraph (g) includes control transistor means for protecting the driving bridge means from circuit malfunctions.
4. An electronic circuit as defined in claim 1 wherein:
 (a) the bi-directional load device is a thermoelectric element, and
 (b) further including a thermistor connected across the input terminals of the sensing bridge means for supplying the variable input signal.
5. An electronic circuit as defined in claim 2 wherein the sensing bridge means includes first, second, third and fourth resistors individually connected in each leg thereof, the input terminals of the sensing bridge means being connected across the fourth resistor, and wherein the individual values of the first and second resistors are relatively large as compared with the value of the third resistor, thereby enhancing the sensitivity of the sensing bridge means.
6. An electronic circuit for controlling the current through a load device in proportion to the magnitude and direction of a variable input signal comprising:
 (a) sensing bridge means having first, second, third and fourth resistors individually connected in each leg thereof, the individual values of the first and second resistors being at least ten times that of the third resistor, a pair of input terminals connected across the fourth resistor and adapted to receive the variable input signal, and a pair of output terminals,
 (b) differential amplifier means including a pair of transistors each having base, emitter and collector electrodes,
 (c) means individually connecting the output terminals of the sensing bridge means to the base electrodes of the transistors,

(d) dual channel amplifying means having a pair of input terminals and a pair of output terminals, and including a pair of integrating capacitors for smoothing out spurious noise signals,
(e) means individually connecting the collector electrodes of the transistors to the input terminals of the dual channel amplifying means,
(f) driving bridge means having a pair of output terminals and including two pairs of transistors of opposite conductivity types, each having base, emitter and collector electrodes, the emitter-collector electrodes and said transistors being individually connected in series in each leg of the driving bridge means,
(g) means individually connecting each output terminal of the dual channel amplifying means to the base electrodes of two of the transistors in the driving bridge means, and
(h) a bi-directional load device connected across the output terminals of the driving bridge means whereby the current through the load device is proportional in both magnitude and direction to the variable input signal.

7. An electronic circuit as defined in claim 6 wherein:
(a) the bi-directional load device is a thermoelectric element, and
(b) further including a thermistor connected across the input terminals of the sensing bridge means for supplying the variable input signal.

References Cited

UNITED STATES PATENTS

| | | | |
|---|---|---|---|
| 2,813,934 | 11/1957 | Cibelins et al. | 330—15 |
| 2,821,639 | 1/1958 | Bright et al. | 301—88.5 |
| 2,846,630 | 8/1958 | Boyle et al. | 318—20.82 |
| 2,859,402 | 11/1958 | Schaeve | 307—88.5 |
| 3,031,855 | 5/1962 | Martz et al. | 307—88.5 X |
| 3,107,324 | 10/1963 | Wright et al. | 321—16 |

ARTHUR GAUSS, *Primary Examiner.*

J. JORDAN, *Assistant Examiner.*